UNITED STATES PATENT OFFICE.

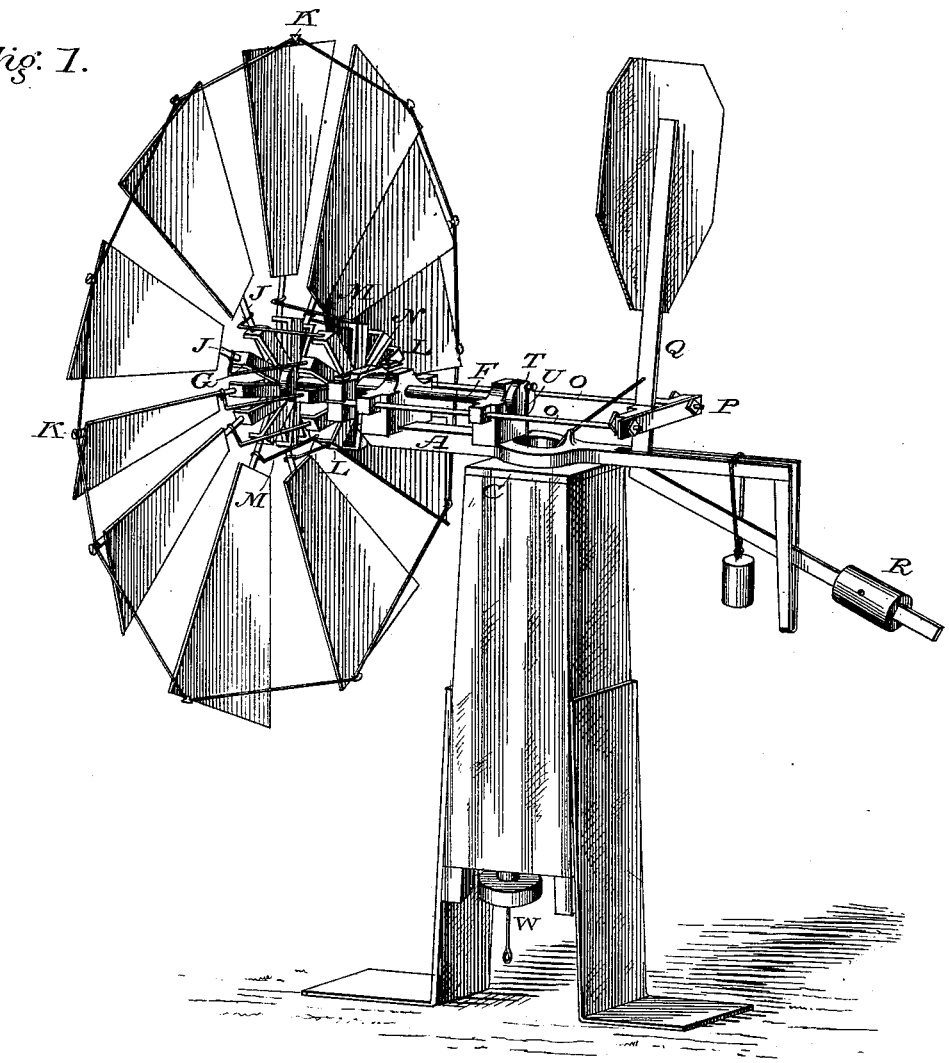

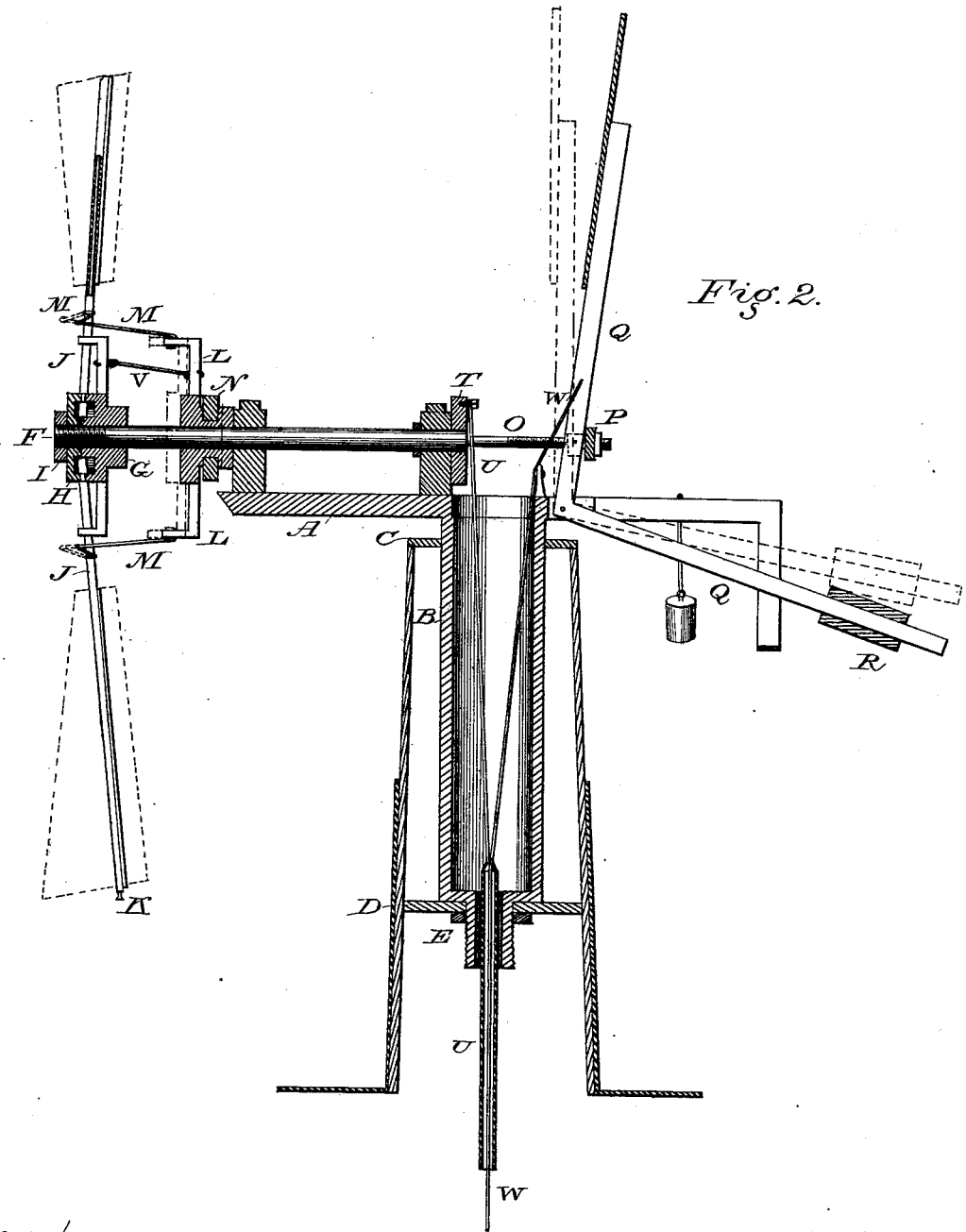

JAMES KENNEDY, JR., OF RACINE, WISCONSIN.

IMPROVEMENT IN WIND-ENGINES.

Specification forming part of Letters Patent No. 218,182, dated August 5, 1879; application filed January 13, 1879.

*To all whom it may concern:*

Be it known that I, JAMES KENNEDY, Jr., of Racine, in the county of Racine and State of Wisconsin, have invented a new and useful Wind Engine for pumping and other uses for which it is adapted, of which the following is a specification.

The object of my invention is to provide an engine to be run by wind-power without the friction and wear of those now used, and yet be sufficiently self-regulating to take care of itself in times of heavy gales.

Those now used (which are self-regulating) are governed by unevenly-balanced fans (as regards wind-surface) acting against a balance-weight, which, in strong wind, causes much friction and wear.

My invention consists in nearly or quite balanced fans (especially as regards wind-surface) turning on or with the spokes of the wind-wheel, and connected with mechanism to a weighted lever, which also takes up one or more other weights as it rises, and is raised by another and separate fan, which is attached to said lever, and as said lever is raised it turns the fans of wheel edgewise to the wind, and as it falls it turns them more transversely or quartering to the wind.

The invention finally consists in the particular construction of the wind-wheel and mechanism connecting the fans with the lever and the taking of extra weight on the lever.

In the accompanying drawings, Figure 1 is a perspective view embodying my invention. Fig. 2 is a vertical section, showing the mechanism which connects the fans to the weighted lever.

On beam A is a hollow stem or shank, B, which passes downward through plate C and block of metal D. Said shank B is formed with shoulder to rest on block D, through which the diminished part passes loosely, and is fastened with nut E, said plate C and block of metal D being securely fastened to timbers of tower. On beam A is mounted on suitable bearings shaft F, on which is spider G, in which are cavities to partially receive bulbs of inner ends of spokes, and arms to clasp spokes at a suitable distance from center of wheel to support them.

Collar H is made with cavities to correspond with cavities in spider G, and when held in place by nut I allows the spokes to turn easily, similar to a swivel.

Spokes J are made hollow, and receive shanks of bulbs at inner end and tie-rod connections K at outer end. Said spokes J are secured to sliding spider L by two links, M, one of which is clasped tightly around spoke at nearly a right angle from fan, to cause part of a revolution of spoke as spider L is moved backward or forward. Each spoke is fastened in like manner to an arm of spider L. Said spider L is made with elongated hub, around which is a groove or neck, in which fits loosely yoke N, to which is secured rods O, which pass through guides forward of cross-head P, to which they are secured and made adjustable by the use of two nuts on each rod O. Said cross-head P is provided with jaws, to which lever Q is bolted. Said lever Q is made with elbow, and at elbow it is pivoted to beam A in such a manner that it can be tilted. Said lever Q is weighted with sliding weight R, which can be adjusted wherever desired and secured by set-screw; and it also takes up one or more other weights as it rises. On upper end of said lever Q is a fan sufficiently large to raise all of said weights, and also turn fans of wind-wheel edgewise to the wind in times of a very heavy gale.

A crank-wheel, T, is attached to shaft F, nearly over center of hollow shank B. To said crank T is attached in the usual manner a pitman, U, which is made hollow and with joint and swivel, and is slotted, through which passes wire W, which also is provided with swivel and runs over a sheave, and is secured to lever Q in a manner to tilt said lever Q.

Spider G and spider L are connected near outer end of arms not directly opposite each other by link and eyebolts V, which causes spider L to turn at the proper time, and yet permits it to slide back and forth on shaft F.

I am aware of the patents to Burrows, June 13, 1870, Ingham, February 4, 1879, and Stevens, March 4, 1879; and I claim nothing therein shown.

What I claim is—

1. In a wind-engine, a vertical crank-lever carrying upon its vertical arm a fan or vane, by which it is actuated, and upon its horizontal arm an adjustable weight, in combination with a weight adjustably arranged upon a permanent bracket, and adapted to be taken up by the horizontal arm of the lever, and mechanism for adjusting the fans of the wheel, as set forth.

2. The combination of lever Q, cross-head P, rods O, yoke N, sliding spider L, links M, hollow spokes J, spider G, collar H, and link and eyebolts V, substantially as described.

JAMES KENNEDY, JR.

Witnesses:
HARRY GRISWOLD,
GRUDER REIERZEM.